United States Patent
Beisele et al.

(10) Patent No.: US 6,764,616 B1
(45) Date of Patent: Jul. 20, 2004

(54) HYDROPHOBIC EPOXIDE RESIN SYSTEM

(75) Inventors: Christian Beisele, Auggen (DE);
Thomas Kainmüller, Weil am Rhein (DE); Qian Tang, Oberwil (CH)

(73) Assignee: Huntsman Advanced Materials Americas Inc., Salt Lake City, UT (US)

( * ) Notice: Subject to any disclaimer, the term of this patent is extended or adjusted under 35 U.S.C. 154(b) by 0 days.

(21) Appl. No.: 09/857,684

(22) PCT Filed: Nov. 29, 1999

(86) PCT No.: PCT/EP99/09240

§ 371 (c)(1),
(2), (4) Date: Jun. 7, 2001

(87) PCT Pub. No.: WO00/34388

PCT Pub. Date: Jun. 15, 2000

(30) Foreign Application Priority Data

Dec. 9, 1999 (CH) ............................................. 2441/98

(51) Int. Cl.$^7$ ................................................. H01B 1/00
(52) U.S. Cl. ...................... 252/500; 524/403; 524/426; 528/26; 528/27; 528/29; 528/31
(58) Field of Search ......................... 252/500; 524/403, 524/426; 528/26, 27, 29, 31

(56) References Cited

U.S. PATENT DOCUMENTS

| 3,926,885 A | 12/1975 | Keil |
| 4,058,401 A | 11/1977 | Crivello |
| 4,336,363 A | 6/1982 | Crivello |
| 5,340,644 A | * 8/1994 | Babcock et al. ............... 442/85 |
| 5,523,374 A | * 6/1996 | Bard et al. ..................... 528/26 |
| 6,048,946 A | 4/2000 | Beisele |

FOREIGN PATENT DOCUMENTS

| EP | 0 066 543 A2 | 5/1982 |
| EP | 0 379 464 A1 | 1/1990 |
| EP | 0 449 776 A2 | 3/1991 |
| EP | 0 580 552 A1 | 7/1993 |
| EP | 0 673 104 A1 | 3/1995 |
| JP | 2-305454 | 5/1989 |
| WO | WO 98/32138 | 7/1998 |

OTHER PUBLICATIONS

DuPont Specialty Chemicals Technical Information "Zonyl™ Fluorochemical Intermediates" 2335928, pp. 1–16 (1994).

W. Patnode et al. "Methylpolysiloxanes" J. Am. Chem. Soc. vol. 68, pp. 358–363 (1946).

* cited by examiner

*Primary Examiner*—Charles Boyer
*Assistant Examiner*—D. G. Hamlin
(74) *Attorney, Agent, or Firm*—Proskauer Rose LLP; Tiffany A. Levato; Kristin H. Neuman

(57) ABSTRACT

A composition comprising
 (a) an epoxy resin,
 (b) an OH-terminated polysiloxane,
 (c) a cyclic polysiloxane and
 (d) a non-ionic, fluoroaliphatic surface-active reagent,
exhibits excellent hydrophobicity properties and can be used as electrical insulating material.

28 Claims, No Drawings

HYDROPHOBIC EPOXIDE RESIN SYSTEM

The present invention relates to a composition comprising an epoxy resin, various poly-siloxanes and fluorinated compounds, to crosslinked products obtainable by curing such a composition and to the use of such a composition as electrical insulating material.

Epoxy resins are frequently used as electrical insulating material on account of their good mechanical properties and their high specific resistance. Cycloaliphatic epoxy resins are especially suitable for outdoor applications because of their high resistance to weathering, but the problem arises, especially in regions having high levels of precipitation and air pollution, that a conductive dirt/water layer can form on the surface of the insulator which leads to leakage currents and arcing and may have consequences ranging from damage to the insulator up to total failure. Even only slightly soiled epoxy-based insulators can undergo a rise in surface conductivity if the surface becomes eroded by weathering in the course of time and the water is better able to wet the resulting roughened layer.

As disclosed in U.S. Pat. No. 3,926,885, epoxy resins can be provided with hydrophobic properties by the addition of polysiloxane/polyether copolymers and OH-terminated polysiloxanes, but the adhesion of the resulting material to metal is not sufficient for all applications.

JP-A 2-305454 describes epoxy resin mixtures having a high degree of stability towards moisture which, in addition to comprising an epoxy novolak and a phenolic resin, also comprise small amounts of a cyclic dimethylsiloxane. Although, in those compositions, the corrosion caused by binding of water on the surface is largely prevented, a hydrophobicity effect sufficient for use as an insulator is not achieved with such systems.

WO 98/32138 describes a resin system suitable as electrical insulating material that is based on curable mixtures of epoxy resins and specific silicone oligomers having terminal glycidyl groups. As a result of the curing, the silicone oligomers become part of the crosslinked structure that is formed, so that known properties of silicones, such as hydrophobicity and good resistance to weathering, can be imparted to the cured material. A disadvantage is the use of expensive commercially available silicone oligomers and a poor hydrophobicity transfer effect.

It has now been found that compositions comprising an epoxy resin, at least two specific polysiloxanes and a non-ionic, fluoroaliphatic surface-active reagent are able to yield storage-stable emulsions that in the fully cured state have a pronounced hydrophobicity transfer effect and recovery effect.

The present invention relates to a composition comprising (a) an epoxy resin,
(b) an OH-terminated polysiloxane,
(c) a cyclic polysiloxane and
(d) a non-ionic, fluoroaliphatic surface-active reagent.

The amounts of components (a) to (c) in the compositions according to the invention can vary within wide limits.

Preference is given to compositions comprising,
based on the total composition (a), (b), (c) and (d),
from 77.0 to 97.99% by weight, especially from 86.0 to 96.95% by weight, component (a),
from 1.0 to 10.0% by weight, especially from 2.0 to 6.0% by weight, component (b),
from 1:0 to 10.0% by weight, especially from 1.0 to 5.0% by weight, component (c) and
from 0.01 to 3.0% by weight, especially from 0.05 to 3.0% by weight, component (d),
the sum of components (a), (b), (c) and (d) being 100% by weight.

As component (a) of the compositions according to the invention there are suitable any type of epoxide that contains at least one glycidyl or β-methylglycidyl group, a linear alkylene oxide group or a cycloalkylene oxide group.

Examples of suitable epoxy resins are polyglycidyl and poly(β-methylglycidyl)ethers obtainable by reaction of a compound containing at least two free alcoholic and/or phenolic hydroxyl groups per molecule with epichlorohydrin or β-methylepichlorohydrin under alkaline conditions, or alternatively in the presence of an acid catalyst with subsequent alkali treatment.

Suitable starting compounds for the preparation of such glycidyl or β-methylglycidyl ethers are, for example, acyclic alcohols, such as ethylene glycol, diethylene glycol and higher poly(oxyethylene)glycols, propane-1,2-diol and poly(oxypropylene)glycols, propane-1,3-diol, butane-1,4-diol, poly(oxytetramethylene)glycols, pentane-1,5-diol, hexane-1,6-diol, hexane-2,4,6-triol, glycerol, 1,1,1-trimethylolpropane, pentaerythritol or sorbitol, cycloaliphatic alcohols, such as resorcitol, quinitol, bis(4-hydroxycyclohexyl)methane, 2,2-bis(4-hydroxy-cyclohexyl)propane and 1,1-bis(hydroxymethyl)cyclohex-3-ene, and alcohols having aromatic nuclei, such as N,N-bis(2-hydroxyethyl)aniline and p,p'-bis(2-hydroxyethylamino)diphenyl-methane.

Further suitable dihydroxy compounds for the preparation of glycidyl or β-methylglycidyl ethers are mononuclear phenols, such as resorcinol and hydroquinone, polynuclear phenols, such as bis(4-hydroxyphenyl)methane, 4,4-dihydroxydiphenyl, bis(4-hydroxyphenyl)sulfone, 1,1,2,2-tetrakis(4-hydroxyphenyl)ethane, 2,2-bis(4-hydroxyphenyl)propane (bisphenol A) and 2,2-bis(3,5-dibromo-4-hydroxyphenyl)propane, and novolaks, for example phenol and cresol novolaks.

Polyglycidyl and poly(β-methylglycidyl) esters are obtainable by reaction of a compound containing two or more carboxylic acid groups per molecule with epichlorohydrin, glycerol dichlorohydrin or β-methylepichlorohydrin in the presence of alkali. Such polyglycidyl esters can be derived from aliphatic polycarboxylic acids, e.g. oxalic acid, succinic acid, glutaric acid, adipic acid, pimelic acid, suberic acid, azelaic acid, sebacic acid or dimerised or trimerised linoleic acid, from cycloaliphatic polycarboxylic acids, such as tetrahydrophthalic acid, 4-methyltetrahydrophthalic acid, hexahydrophthalic acid and 4-methylhexahydrophthalic acid, and from aromatic polycarboxylic acids, such as phthalic acid, isophthalic acid and terephthalic acid.

Further epoxides suitable as component (a) are poly(N-glycidyl) compounds, for example the products obtainable by dehydrochlorination of the reaction products of epichlorohydrin and amines containing at least two amino hydrogen atoms, such as aniline, n-butylamine, bis(4-aminophenyl) methane and bis(4-methyl-aminophenyl)methane. Also included are triglycidyl isocyanurate as well as N,N'-diglycidyl derivatives of cyclic alkyleneureas, such as ethylene-urea and 1,3-propyleneurea and hydantoins, such as 5,5-dimethylhydantoin. Poly(S-glycidyl) compounds, for example the di-S-glycidyl derivatives of dithiols, such as ethane-1,2-dithiol and bis(4-mercaptomethylphenyl) ether, are likewise suitable.

Preferably the compositions comprise as component (a) a cycloaliphatic epoxy resin or an epoxidation product of a natural unsaturated oil or a derivative thereof.

The term "cycloaliphatic epoxy resin" in the context of this invention denotes any epoxy resin having cycloaliphatic structural units, that is to say it includes both cycloaliphatic glycidyl compounds and β-methylglycidyl compounds as well as epoxy resins based on cyclo-alkylene oxides.

Suitable cycloaliphatic glycidyl compounds and Vmethylglycidyl compounds are the glycidyl esters and β-methylglycidyl esters of cycloaliphatic polycarboxylic acids, such as tetrahydrophthalic acid, 4-methyltetrahydrophthalic acid, hexahydrophthalic acid, 3-methylhexahydrophthalic acid and 4-methylhexahydrophthalic acid.

Further suitable cycloaliphatic epoxy resins are the diglycidyl ethers and β-methylglycidyl ethers of cycloaliphatic alcohols, such as 1,2-dihydroxycyclohexane, 1,3-dihydroxycyclohexane and 1,4-dihydroxycyclohexane, 1,4-cyclohexanedimethanol, 1,1-bis(hydroxymethyl)cyclohex-3ene, bis(4-hydroxycyclohexyl)methane, 2,2-bis(4-hydroxycyclohexyl)propane and bis(4-hydroxycyclohexyl) sulfone.

Examples of epoxy resins having cycloalkylene oxide structures are bis(2,3-epoxycyclopentyl) ether, 2,3-epoxycyclopentylglycidyl ether, 1,2-bis(2,3-epoxycyclopentyl)ethane, vinyl cyclohexene dioxide, 3,4-epoxycyclohexylmethyl 3',4'-epoxycyclohexanecarboxylate, 3,4-epoxy6-methylcyclohexylmethyl 3',4'-epoxy-6'-methylcyclohexanecarboxylate, bis(3,4-epoxycyclohexylmethyl) adipate and bis(3,4-epoxy-6-methylcyclohexylmethyl) adipate.

Preferred cycloaliphatic epoxy resins are bis(4-hydroxycyclohexyl)methanediglycidyl ether, 2,2-bis(4-hydroxycyclohexyl)propanediglycidyl ether, tetrahydrophthalic acid diglycidyl ester, 4-methyltetrahydrophthalic acid diglycidyl ester, 4-methylhexahydrophthalic acid diglycidyl ester, and especially hexahydrophthalic acid diglycidyl ester and 3,4-epoxycyclohexylmethyl 3',4'-epoxycyclohexanecarboxylate.

As component (a) it is also possible to use in the compositions according to the invention epoxidation products of unsaturated fatty acid esters. It is preferable to use epoxy-containing compounds derived from mono- and poly-fatty acids having from 12 to 22 carbon atoms and an iodine number of from 30 to 400, for example lauroleic acid, myristoleic acid, palmitoleic acid, oleic acid, gadoleic acid, erucic acid, ricinoleic acid, linoleic acid, linolenic acid, elaidic acid, licanic acid, arachidonic acid and clupanodonic acid.

For example, there are suitable the epoxidation products of soybean oil, linseed oil, perilla oil, tung oil, oiticica oil, safflower oil, poppyseed oil, hemp oil, cottonseed oil, sunflower oil, rapeseed oil, polyunsaturated triglycerides, triglycerides from euphorbia plants, groundnut oil, olive oil, olive kernel oil, almond oil, kapok oil, hazelnut oil, apricot kernel oil, beechnut oil, lupin oil, maize oil, sesame oil, grapeseed oil, lallemantia oil, castor oil, herring oil, sardine oil, menhaden oil, whale oil, tall oil and derivatives thereof.

Also suitable are higher unsaturated derivatives that can be obtained by subsequent dehydrogenation reactions of those oils.

The olefinic double bonds of the unsaturated fatty acid radicals of the above-mentioned compounds can be epoxidised in accordance with known methods, for example by reaction with hydrogen peroxide, optionally in the presence of a catalyst, an alkyl hydroperoxide or a per acid, for example performic acid or peracetic acid.

Within the scope of the invention, both the fully epoxidised oils and the partially epoxidised derivatives that still contain free double bonds can be used as component (a).

Especially preferred as component (a) are epoxidised soybean oil and epoxidised linseed oil.

The OH-terminated polysiloxanes in accordance with component (b) can be prepared according to known methods, for example by hydrolysis of the corresponding organochlorosilanes and subsequent polycondensation of the silanols, there generally being formed polysiloxane mixtures having molecular masses of from 1000 to 150 000 g/mol. A number of such OH-terminated polysiloxanes are commercially available.

In the compositions according to the invention it is preferable to use liquid polysiloxanes.

There is preferably used a polysiloxane of formula I

(I)

wherein $R_1$ and $R_2$ are each independently of the other $C_1$–$C_{18}$alkyl, $C_5$–$C_{14}$aryl or $C_6$–$C_{24}$-aralkyl and n is an average value of from 3 to 60, especially from 4 to 20.

Alkyl includes, for example, methyl, ethyl, isopropyl, n-propyl, n-butyl, isobutyl, sec-butyl, tert-butyl and the various isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl groups.

Aryl as $R_1$ or $R_2$ contains preferably from 6 to 14 carbon atoms and may be, for example, phenyl, tolyl, pentalinyl, indenyl, naphthyl, azulinyl and anthryl.

Aralkyl as $R_1$ or $R_2$ contains preferably from 7 to 12 carbon atoms and especially from 7 to 10 carbon atoms. It may be, for example, benzyl, phenylethyl, 3-phenylpropyl, α-methylbenzyl, 4-phenylbutyl or α,α-dimethylbenzyl.

Special preference is given to polysiloxanes of formula I wherein $R_1$ and $R_2$ are each independently of the other methyl, ethyl or phenyl.

Especially preferred as component (b) are polysiloxanes of formula I wherein $R_1$ and $R_2$ are methyl and n=4 to 20.

The cyclic polysiloxanes in accordance with component (c) are likewise known to the person skilled in the art and can be prepared according to known methods.

There is preferably used as component (c) a cyclic polysiloxane of formula II

(II)

wherein $R_1$ and $R_2$ are each independently of the other $C_1$–$C_{18}$alkyl, $C_5$–$C_{14}$aryl or $C_6$–$C_{24}$-aralkyl and m is an integer from 3 to 12.

Alkyl, aryl and aralkyl in formula (II) have the same definitions as the corresponding groups according to formula (I).

Preferred as component (c) are cyclic polysiloxanes of formula II wherein $R_1$ and $R_2$ are each independently of the other methyl, ethyl or phenyl and m is an integer from 3 to 8.

Very especially, $R_1$ and $R_2$ are methyl and m is an integer from 6 to 8.

As described in J. Am. Chem. Soc. 68, 358 (1946), such cyclic polysiloxanes can be isolated from the product mixture formed on hydrolysis of the corresponding dialkyl-, diaryl- or diaralkyl-dichlorosilanes.

Especially preferred as component (c) are the commercially available compounds octa-methylcyclotetrasiloxane (m=4), decamethylcyclopentasiloxane (m=5) and especially dodecamethylcyclohexasiloxane (m=6) and also hydrolysates of dimethyldichlorosilane, especially undistilled hydrolysates, since they have higher contents of cyclic polysiloxanes having the preferred ring size m=6 to 8, and hence in addition to dodecamethylcyclohexasiloxane also tetradecamethylcycloheptasiloxane (m=7) and hexadecamethylcyclooctasiloxane (m=8).

As surface-active reagent in the form of component (d) of the compositions according to the invention there are suitable derivatives of non-ionic, perfluorinated polyalkylenes, such as perfluorinated polyoxyalkylenes. Preference is given to compounds of a combination of a perfluorinated aliphatic alkyl unit $R_f$ with a hydrocarbon unit R, in which the latter contains at least one, preferably oxygen-containing, mono- or di-valent polar functional group, e.g. —OH, —COOH, —COOR, —COO—, —CO—, —O—.

Suitable compounds are alkoxylated, especially ethoxylated, perfluorinated fatty acid derivatives, for example:

   (III)

or

   (IV), wherein m=1 to 200, $R_f$ is a linear or branched perfluorinated alkyl having from 2 to 22 carbon atoms and R=H, $C_1$–$C_6$alkyl or $R_f$.

It is preferable to use compounds of formula (III) or (IV) in which the molecular mass according to the theoretical empirical formula is only from 200 to 10000, especially from 300 to 8000.

Preferred compounds are, for example, $F_3C$—$(CF_2)_5$—$(CH_2CH_2O)$—H=1,1,2,2-tetrahydro-perfluorooctanol (corresponding to formula (IV), wherein $R_f$=perfluorinated n-hexyl, m=1 and R=H) or $R_f$—COO—$(CH_2CH_2O)_m$—R, wherein $R_f$ is a linear perfluorinated alkyl having from 16 to 18 carbon atoms, m=110–130 and R=H.

Some of those compounds are commercially obtainable from a number of sources, e.g. as ZONYL® Fluorochemical Intermediates (DuPont), e.g. ZONYL® BA-L and BA Fluoro-alcohols, or FLUORAD® Fluorosurfactants (3M), e.g. FLUORAD® FC431. Further surface-active compounds suitable for use according to the invention can be found in the technical bulletins of the manufacturers mentioned, for example "Technical Information" 233592B (1/94) relating to ZONYL® Fluorochemical Intermediates (DuPont).

One or more compounds of each component (a) to (d) can be used in the compositions according to the invention.

The compositions according to the invention can be cured in principle by cationic polymerisation of the epoxy resin system using an initiator system or using any customary epoxy hardener, but it is preferable to use anhydride hardeners.

The invention therefore relates also to a composition comprising the above-mentioned components (a) to (d) and additionally as component (e) a polycarboxylic anhydride.

Such an anhydride may be a linear aliphatic polymeric anhydride, for example polysebacic polyanhydride or polyazelaic polyanhydride, or a cyclic carboxylic anhydride.

Cyclic carboxylic anhydrides are especially preferred. Examples of cyclic carboxylic anhydrides are:

succinic anhydride, citraconic anhydride, itaconic anhydride, alkenyl-substituted succinic anhydrides, dodecenylsuccinic anhydride, maleic anhydride and tricarballylic anhydride, a maleic anhydride adduct with cyclopentadiene or methylcyclopentadiene, a linoleic acid adduct with maleic anhydride, alkylated endoalkylenetetrahydrophthalic anhydrides, methyltetrahydrophthalic anhydride and tetrahydrophthalic anhydride, the isomeric mixtures of the two latter compounds being especially suitable. Especially preferred are hexahydrophthalic anhydride and methylhexahydrophthalic anhydride.

Further examples of cyclic carboxylic anhydrides are aromatic anhydrides, for example pyromellitic dianhydride, trimellitic anhydride and phthalic anhydride.

It is also possible to use chlorinated or brominated anhydrides, e.g. tetrachlorophthalic anhydride, tetrabromophthalic anhydride, dichloromaleic anhydride and chlorendic anhydride.

The compositions according to the invention can optionally additionally comprise a curing accelerator (f). Suitable accelerators are known to the person skilled in the art. Examples that may be mentioned are:

complexes of amines, especially tertiary amines, with boron trichloride or boron trifluoride;

tertiary amines, such as benzyldimethylamine;

urea derivatives, such as N-4-chlorophenyl-N',N'-dimethylurea (monuron);

unsubstituted or substituted imidazoles, such as imidazole or 2-phenylimidazole.

Preferred accelerators are tertiary amines, especially benzyldimethylamine, and imidazoles (e.g. 1-methylimidazole) for the above-mentioned compositions that comprise epoxidised oils.

The components (e) and (f) are used in the customary effective amounts, that is to say amounts sufficient for curing the compositions according to the invention. The ratio of components (a) and (e) and optionally (f depends upon the nature of the compounds used, the rate of curing required and the properties desired in the end product and can readily be determined by the person skilled in the art. Generally, from 0.4 to 1.6 equivalents, preferably from 0.8 to 1.2 equivalents, of anhydride groups per epoxy equivalent are used.

The resin mixture (a) to (d) and the hardener component (e), optionally together with the accelerator (f), are generally stored separately and mixed together only shortly before application. If the resin mixture (a) to (d) is to be kept in interim storage prior to curing, the resin mixture (a) to (d) requires an additional auxiliary as an optional component (g) in order that the mixture, which forms an emulsion, can be maintained in storable form. As such a stabilising auxiliary there may be used emulsifiers (surface-active and interfacially active compounds) and thickeners (for example silicic acids, bentonites, dibenzylidenesorbitol etc.). Such auxiliaries and their use are well known to the person skilled in the art.

Of the auxiliaries mentioned, the use of highly dispersed silicic acid is preferred. Highly dispersed, hydrophilic, untreated silicic acids are especially suitable. They are commercially available, for example in the form of Aerosil®. The effective amounts of silicic acid are in the range of from 0.01 to 3.5% by weight, preferably from 0.05 to 3.0% by weight, based on the sum of components (a) to (d), and the average size of the primary particles is advantageously about 12 nm.

The invention therefore relates also to storage-stable compositions obtainable by the addition of stabilising auxilaries, such as emulsifiers and thickeners. Instead of hardener component (e), optionally together with an accelerator (f), the resin mixture (a) to (d) may comprise as component (e) an initiator system for the cationic polymerisation of the epoxy resin.

As initiator system for the cationic polymerisation of the epoxy resins there are used, for example, thermally activatable initiators, such as thermally activatable onium salts, oxonium salts, iodonium salts, sulfonium salts, phosphonium salts or quaternary ammonium salts that do not contain nucleophilic anions. Such initiators and their use are known. For example, U.S. Pat. No. 4,336,363, EP-A-0 379 464 and EP-A0 580 552 disclose specific sulfonium salts as curing agents for epoxy resins. U.S. Pat. No. 4,058,401, in addition to describing specific sulfonium salts, also describes the corresponding salts of tellurium and selenium.

Quaternary ammonium salts as thermally activatable initiators are disclosed, for example, in EP-A0 066 543 and in EP-A-0 673 104. They are salts of aromatic-heterocyclic nitrogen bases with non-nucleophilic, for example complex, halide anions, such as $BF_4^-$, $PF_6^-$, $SbF_6^-$, $SbF_5(OH)^-$ and $AsF_6^-$.

As quaternary ammonium salt there is especially used N-benzylquinolinium hexafluoro-antimonate.

When quaternary ammonium salts are used it is advantageous to use in addition a thermal free-radical former, for example pinacols and their ethers, esters or silyl derivatives. Such compounds are known and can be prepared in accordance with known procedures.

As thermal free-radical formers there are preferably used the pinacols, such as acetophenone pinacols or especially 1,1,2,2-tetraphenyl-1,2-ethanediol (benzopinacol).

As thermally activatable initiator there is especially used N-benzylquinolinium hexafluoroantimonate together with 1,1,2,2-tetraphenyl-1,2-ethanediol, preferably in a molar ratio of about 1:1.

The activation temperature of the cationic initiators is generally above room temperature, preferably in the range of from 60 to 180° C., especially from 90 to 150° C.

The amount of cationic initiator contained in the cationically curable epoxy resin is generally from 0.05 to 30% by weight, preferably from 0.5 to 15% by weight, based on the amount of cationically polymerisable epoxy resin.

Furthermore, the curable mixtures may comprise tougheners, for example core/shell polymers or the elastomers or elastomercontaining graft oilymers known to the person skilled in the art as rubber tougheners.

Suitable tougheners are described, for example, in EP-A-0 449 776. They are preferably used in an amount of from 1 to 20% by weight, based on the total amount of epoxy resin in the composition.

The curable mixtures may also comprise further fillers in addition to those mentioned above, for example metal powder, wood flour, glass powder, glass beads, semi-metal and metal oxides, such as $SiO_2$ (quartz sand, quartz powder, silanised quartz powder, fused silica powder, silanised fused silica powder), aluminium oxide, titanium oxide and zirconium oxide, metal hydroxides, such as $Mg(OH)_2$, $Al(OH)_3$, silanised $Al(OH)_3$ and $AlO(OH)$, semi-metal and metal nitrides, for example silicon nitride, boron nitrides and aluminium nitride, semi-metal and metal carbides (SiC and boron carbides), metal carbonates (dolomite, chalk, $CaCO_3$), metal sulfates (barite, gypsum), ground minerals, e.g. of hydromagnesite and huntite, and natural or synthetic minerals chiefly of the silicate series, e.g. zeolites (especially molecular sieves), talcum, mica, kaolin, wollastonite and others. Preferred fillers are quartz powder, silanised quartz powder, aluminium hydroxide and aluminium oxide.

In addition to the additives mentioned above, the curable mixtures may also comprise further customary ingredients, e.g. antioxidants, light stabilisers, flame retardants, fillers containing water of crystallisation, plasticisers, dyes, pigments, fungicides, thixotropic agents, toughness improvers, antifoams, antistatics, lubricants, anti-settling agents, wetting agents and mould-release agents.

The compositions according to the invention can be produced in accordance with known methods using known mixing apparatus, for example stirrers (especially dispersers and Supraton® having a high shear gradient), kneaders, rollers orr dry mixers. In the case of solid epoxy resins, the dispersing can also be carried out in the melt.

The curing of the mixtures according to the invention can be carried out in known manner in one or more stages. It is generally effected by heating the mixtures to temperatures of from 60° C. to 200° C., especially from 80° C. to 180° C.

The invention relates also to the crosslinked products obtainable by curing a composition according to the invention.

Surprisingly, in comparison with the corresponding unmodified systems (Comparison Example 1), the addition of the two chemically different siloxane components and the surface-active reagent in the compositions according to the invention results in virtually no impairment, or only slight impairment, of the mechanical and electrical properties of the products obtained therefrom.

The addition of silicones generally results in impairment of the adhesion properties, but the compositions according to the invention nevertheless unexpectedly exhibit good adhesion to metal, which is revealed by the fact that the good cantilever strength and pull-out strength values remain unchanged. Likewise, shaped articles encapsulated using a system according to the invention are surprisingly found to have a comparatively very good temperature change behaviour.

In comparison with unmodified systems. the invention offers the advantage that traces of the siloxanes used according to the invention are able to migrate onto any soiling present on the fully cured material. As a result, an initially hydrophilic layer of dirt also becomes hydrophobic (hydrophobicity transfer), with the result that water more readily rolls away from the soiling in the form of beads and does not form a coherent conductive, and therefore harmful, dirt/water layer, as is the case with the unmodified system. This effect is even, surprisingly, very pronounced. The water runs off in a considerably better and more rapid manner. Surprisingly, the durability of this effect is also very good, that is to say the pronounced hydrophobicity transfer effect is retained even when the layer of dirt is repeatedly removed and reapplied.

Even in the case of only slightly soiled epoxy-resin-based insulators, there may be a loss of the original hydrophobicity and thus a rise in the surface conductivity, the reason being microdischarges which can be caused, for example, by individual raindrops on the insulator surface.

In comparison with unmodified systems (Comparison Example 1), a further advantage of the present invention is that, by means of the present systems, the hydrophobicity may surprisingly be regained after such an imposed loss, that is to say the original hydrophobicity is restored within a period ranging from hours to a few days ("recovery" effect).

As a result, the systems according to the invention with their excellent hydrophobicity properties in the form of a very good and at the same time long-lasting hydrophobicity transfer effect in combination with a very good recovery effect and good temperature change properties are by their nature suitable for use as insulating material for outdoor applications in fields of use where climatic conditions are difficult.

The compositions according to the invention are especially suitable as casting resins, casting compounds ("structural casting"), laminating resins, compression moulding compounds ("epoxy moulding compounds"), coating compounds and especially as electrical insulating compounds.

The invention relates also to the use of the compositions according to the invention as electrical insulating material.

In the following Examples, the following commercially available substances are used:

epoxy resin 1: liquid hexahydrophthalic acid diglycidyl ester; epoxy content: 5.6 to 6.2 eq./kg ("CY 184", Ciba Spezialitaten Chemie)

ESO epoxidised soybean oil; epoxy content: 4.10 to 4.20 eq./kg; ("Reoplast", Witco)

ELO epoxidised linseed oil; epoxy content: 5.50 to 5.65 eq./kg: ("Merginat", Harburger Chemie)

hardener 1 hardener mixture of 70 parts by weight of hexahydrophthalic anhydride and 30 parts by weight of methylhexahydrophthalic anhydride W 12: untreated quartz powder (Quarzwerke Frechen)

W 12 EST: quartz powder pretreated with epoxysilane (Quarzwerke Frechen)

polysiloxane 1: OH-terminated polydimethylsiloxane having a viscosity of 5 Pa·s ("NG200-5000", Wacker)

polysiloxane 2: mixture of linear OH-terminated ($\leq 40\%$) polydimethylsiloxanes and cyclic dimethylsiloxanes ($\geq 60\%$) having a viscosity of 5 to 20 Pa·s ("Dimethylmethanolysat", GE-Bayer AG)

Fluorad: non-ionic perfluorinated aliphatic polymeric ester (ethoxylated perfluorinated fatty acid) ("Fluorad FC 431", 3M)

BDMA benzyldimethylamine

1-MI 1-methylimidazole

Aerosil hydrophilic, highly dispersed silicic acid ("Aerosil 200", Degussa)

PREPARATION EXAMPLES

Comparison Example 1

In a mixing apparatus having a blade stirring mechanism, 1000 g of epoxy resin 1, 900 g of hardener 1, 5.0 g of BDMA and 2700 g of quartz powder W 12 EST are mixed together within a period of 30 min at 60° C. using a mixer having a blade stirring mechanism and then briefly degassed at about 10 mbar. The composition is then cured for 6 hours at 80° C. and for 10 hours at 140° C. The properties of the cured product are summarised in Table 1.

Invention Example 1

In a mixing apparatus having a disperser disc, 9050 g of epoxy resin 1, 200 g of polysiloxane 1, 500 g of polysiloxane 2 and 100 g of Fluorad are mixed together at 3750 rev/min at room temperature in the course of 10 minutes. 150 g of Aerosil are then added to the mixture and mixing is carried out at 3750 rev/min at room temperature within a period of one hour, yielding a white, storage-stable emulsion. 1000 g of the resin premix so prepared are mixed with 814.5 g of hardener 1, 4.5 g of BDMA and 2578.1 g of quartz powder W 12 EST within a period of 30 min at 60° C. using a mixer having a blade stirring mechanism and then briefly degassed at about 10 mbar.

The composition is then cured for 6 hours at 80° C. and for 10 hours at 140° C. The properties of the cured product are summarised in Table 1.

Invention Example 2

In a mixing apparatus having a disperser disc, 6855 g of epoxy resin 1, 200 g of polysiloxane 1, 500 g of polysiloxane 2, 10 g of Fluorad, 1143 of ESO and 1143 g of ELO are mixed together at 3750 rev/min at room temperature in the course of 10 minutes. 150 g of Aerosil are then added to the mixture and mixing is carried out at 3750 rev/min at room temperature within a period of one hour, yielding a white, storage-stable emulsion. 1000 g of the resin premix so prepared are mixed with 806.6 g of hardener 1, 2.3 g of BDMA, 4.5 g of 1-MI and 2567.1 g of quartz powder W 12 EST within a period of 30 min at 60° C. using a mixer having a blade stirring mechanism and then briefly degassed at about 10 mbar.

The composition is then cured for 6 hours at 80° C. and for 10 hours at 140° C. The properties of the cured product are summarised in Table 1.

Invention Example 3

In a mixing apparatus having a disperser disc, first of all 50 g of dibenzylidenesorbitol are dissolved in 9100 g of epoxy resin 1 at a maximum of 110° and the mixture is then cooled to room temperature. 200 g of polysiloxane 1, 500 g of polysiloxane 2 and 100 g of Fluorad are then added and the mixture is stirred at 1500 rev/min at room temperature for 15 minutes. 50 g of Aerosil are then added to the mixture and at room temperature the entire mixture is stirred at 1500 rev/min for a further one hour, yielding a white, storage-stable emulsion. 1000 g of the resin premix so prepared are mixed with 820 g of hardener 1, 4.5 g of BDMA and 3542 g of quartz powder W 12 EST within a period of 30 min at 60° C. using a mixer having a blade stirring mechanism and then briefly degassed at about 10 mbar.

Application Example 1

Pin insulators are produced by means of the pressure gelation process. For that purpose, the uncured mixtures, prepared according to Example 1 and analogously to Comparison Example 1 but with a degree of filler of 66% by weight, are injected into a metal mould which has been heated to 140° C. and treated with parting agent. After gelation (after about 20 min), the casting is removed from the mould and post-cured for 10 hours at 140° C. The insulator produced from the composition according to the invention surprisingly has a cantilever strength of a level similar to that of the insulator produced from the analogous composition without silicone additives, while a comparison of the pull-out strengths shows that the material according to the invention still adheres very well to the insert (see Table 1).

Application Example 2

The improved behaviour of the insulators produced using the system modified according to the invention in atmospheres having a high level of air pollution, especially the improved hydrophobicity properties, are demonstrated by the following tests:

2A: Hydrophobicity Transfer Effect

Specimens of Invention Examples 1 to 3 are tested to demonstrate the so-called "hydrophobicity transfer effect". For that purpose, artificial soiling is applied to four plates made of material prepared with the product according to Invention Examples 1 to 3 and Comparison Example 1 (prepared without the use of silicone-containing parting agents and cleaned with acetone after demoulding). For that purpose, quartz powder W 12 is applied to the plates from a vibrating apparatus in an amount per unit area sufficient to produce a foreign layer 0.5 mm thick when the powder is smoothed with a ruler or the like. In order to test whether or not the material then transfers the hydrophobicity to the quartz layer, which is actually hydrophilic, at specific time intervals a 30 µl water droplet is applied to the foreign layer using a pipette, the behaviour of the droplet is observed and classified in accordance with the following scheme:

| TS | Properties | Level specimen | Specimen inclined at 45° | Specimen initially level, then inclined at 45° |
|---|---|---|---|---|
| | | Transfer state system (TS) | | |
| 1 | No hydrophobicity transfer effect (HTE) | Droplet is immediately absorbed | | |
| 1.5 | | Droplet is absorbed within 2 minutes | | |
| 2 | weak HTE | Droplet remains stable for 2 minutes | | |
| 2.5 | | | Droplet forms "nose shape" | |
| 3 | moderate HTE | | Runs off with a large amount of foreign layer material | Droplet remains stable on tilting |
| 3.5 | | | Runs off with a large amount of foreign layer material | Droplet forms "nose shape" on tilting |
| 4 | good HTE | | | Droplet runs off on tilting, leaving a clearly visible track |
| 4.5 | | | | Droplet leaves a slight track on tilting |
| 5 | excellent HTE | Droplet runs off without foreign material and "dances about" when specimen is tilted slightly | | |

Transfer state system: 500 μm thick quartz powder layer (quartz powder W12, Quarzwerke Freshen), Application on 30 μl water droplet 2B: Demonstration of the "Recovery" Effect by Means of a Plasma Test In order to demonstrate the recovery effect, the state of hydrophobicity is determined (see 2B1). Then a state of hydrophilicity is imposed by the use of a plasma (see 2B2). After the plasma treatment, which is intended to bring about loss of hydrophobicity, the state of the surface is again investigated at various time intervals (immediately, after one hour (h) and one day (d)). A recovery effect is present when a specimen passes from a hydrophilic state (in about class 5 to 7) to a hydrophobic state (in about class 1 to 4), that is to say when the state prior to the plasma treatment has approximately been restored. The results are summarised in Table 1.

2B1

The hydrophobicity state of the specimens at any given time is determined as follows: a vertically arranged specimen surface about 100 cm in size is sprayed with water 20 times (once per second) from a distance of about 25+10 cm using a spray bottle. After a further 10 seconds the specimen is examined and the state of the surface is classified in accordance with the following scheme.

| Class HC | Properties | Description of the effects |
|---|---|---|
| | Classification of the hydrophobicity state in the spraying test | |
| 1 | Excellent surface hydrophobicity | Only discrete droplets, contact angle for the majority of droplets is >80° |
| 2 | Very good surface hydrophobicity | Only discrete droplets, contact angle for the majority of droplets is >50° but <80° |
| 3 | Good surface hydrophobicity | Only discrete droplets, contact angle for the majority of droplets is >20° but <50° |
| 4 | Moderate surface hydrophobicity | Discrete droplets and discrete wetted areas, the size of the individual wetted areas is <2 cm$^2$ and the total wetted area is <90% |
| 5 | Low surface hydrophobicity | Some discrete wetted areas, areas >2 cm$^2$, the size of the total wetted area is <90% |
| 6 | Low hydrophilicity | >90% of the total area is wetted but some unwetted sites can be identified |
| 7 | Very hydrophilic surface | Continuous film of water over the entire area tested |

2B2

A loss of hydrophobicity, i.e. hydrophilicity, is imposed by means of a plasma treatment. For that purpose, the test plates, which have dimensions of 10×10×0.4 cm$^3$ are placed in a plasma chamber type 440 (Technics Plasma GmbH) and exposed to the following conditions: plasma treatment time: 2 min, pressure: 2 to 3 mbar, gas: oxygen, output: 200 Watt. The treatment results in the loss of hydrophobicity (see Table 1).

Comparative Application Examples

Three Comparison Examples are prepared in principle analogously to Invention Example 1. Unlike Invention Example 1, in which polysiloxanes 1 and 2 and a surface-active reagent are used at the same time, in each Comparison Example only one additive is used. The individual compositions and the properties of the cured products are summarised in Table 1.

TABLE 1

| Comparison and Invention Examples | CE 1 | IE 1 | IE 2 | IE 3 | CE 2 | CE 3 | CE 4 |
|---|---|---|---|---|---|---|---|
| Composition [parts by weight] | | | | | | | |
| epoxy resin 1 | 100 | 90.5 | 68.55 | 91 | 97 | 94 | 99 |
| ESO | | | 11.43 | | | | |
| ELO | | | 11.43 | | | | |
| polysiloxane 1 | | 2 | 2 | 2 | 2 | | |
| polysiloxane 2 | | 5 | 5 | 5 | | 5 | |
| Fluorad | | 1 | 0.1 | 1 | | | 1 |
| BDMA | 0.5 | 0.45 | 0.23 | 0.45 | 0.49 | 0.47 | 0.5 |
| 1-MI | | | 0.45 | | | | |
| Aerosil | | 1.5 | 1.5 | 0.5 | 1 | 1 | |
| dibenzylidenesorbitol | | | | 0.5 | | | |
| hardener 1 | 90 | 81.45 | 80.66 | 82 | 87.3 | 84.6 | 89.1 |
| W 12 EST | 270 | 257.8 | 254.6 | 354.2 | 266.1 | 262.3 | 268.7 |
| Stability of the emulsion (resin components + Aerosil) | one phase | good | good | good | poor | poor | one phase |
| Tg (DSC) [° C.] | 110 | 110 | 109 | 110 | | | |
| tangent δ (50 Hz) [%] | | | | | | | |
| at 24° C. | 1 | 0.5 | 0.2 | | | | |
| at 100° C. | 2 | 1.6 | 1.7 | | | | |
| temperature at 8% loss [° C.] | 125 | 127 | 123 | | | | |
| tensile strength [MPa] | 90 | 86 | 75 | | | | |
| elongation at break [%] | 1.4 | 1.4 | 1.3 | | | | |
| bending strength [MPa] | 125 | 137 | 127 | | | | |
| outer fibre strain [%] | 1.3 | 1.6 | 1.7 | | | | |
| elasticity modulus in flexure [MPa] | 10500 | 9785 | 8813 | | | | |
| critical stress intensity factor K1C [MPa · (m)½] | 2.25 | 2.24 | 2.12 | | | | |
| breaking energy $G_{1C}$ [J/m$^2$] | 485 | 465 | 465 | | | | |
| Application Examples (AE) | AE 2 | AE 2 | AE 2 | AE 2 | AE 2 | AE 2 | AE 2 |
| transfer state [TS] | | | | | | | |
| after 50 h | 1 | 3.5 | 3.5 | 4.5 | 2.5 | | 1 |
| after 500 h | 1 | 4 | 4 | 4.5 | 3.5 | | 1 |
| after 500 h in 2nd application | 1 | 4 | 4 | 4.5 | | | |
| hydrophobicity class [HC] before plasma | 3 | 2 | 3 | | 3 | 2 | 2 |
| immediately after plasma | 7 | 7 | 7 | | 6 | 6 | 6 |
| 1 h after plasma | 7 | 2 | 6 | | 5 | 5 | 7 |
| 1 d after plasma | 6 | 1 | 3 | | 5 | 5 | 5 |
| Application Examples (AE) | | AE 1 | AE 1 | AE 1 | AE 3 | | |
| filler content [%] | | 66 | 66 | 66 | 66 | | |
| cantilever strength [N] | | 6125 | 5972 | 5509 | crack | | |
| pull-out strength [N] | | 71.6 | 64.8 | 62 | test | | |

DSC (Differential Scanning Calorimetry) carried out using a TA 4000 apparatus (Mettier)
electrical values (tangent δ) according to DIN 53483, measurement frequency 50 Hz
tensile strength and breaking strength according to ISO R527
bending strength, outer fibre strain and elasticity modulus in flexure according to ISO 178
K1C and G1C: double torsion test Table 1 shows:
1) The properties of an unmodified reference material: No hydrophobicity transfer is found, but good surface hydrophobicity. After the loss thereof (by means of plasma), however, the surface hydrophobicity is not restored.
2) The properties of the modified compositions according to the invention: Example 1 very quickly exhibits a good hydrophobicity transfer effect, as it does also in the second application of the foreign layer. The material is very hydrophobic in the starting state and very quickly regains hydrophobicity after the imposed loss by means of the plasma and therefore exhibits an excellent recovery effect.

The second Example exhibits virtually the same hydrophobicity transfer effect as Example 1, but the surface hydrophobicity is not as good. After the loss thereof (by means of plasma), hydrophobicity is restored, but less quickly than in Example 1. The third Example exhibits a very good hydrophobicity transfer effect which is established rapidly.

3) The further Comparison Examples show that the recovery effect cannot be influenced by the individual additives alone. In all cases the hydrophobicity is not regained after imposed loss.

Application Example 3 (Comparative Cracking Test)

Shaped steel articles are encapsulated either with casting resin system 3 according to the invention (see IE3) or with an unmodified casting resin system and the resin is cured. Then in a cycle having defined time units, the shaped articles are exposed to specific periods at steadily increasing temperatures and after each period are examined for any crack formation which may have occurred.

Preparation of the unmodified comparison mixture (analogously to Comparison Example 1): In a mixing apparatus having a blade stirring mechanism, 1000 g of epoxy resin 1, 900 g of hardener 1, 5.0 g of BDMA and 3780 g of quartz powder W 12 EST are mixed together in the course of 30 min at 60° C. using a mixer having a blade stirring mechanism and then briefly degassed at about 10 mbar.

The shaped articles are subjected to the cracking test described below:

Cracking Test

In an aluminium casting mould having depressions, batches of 20 steel test specimens of the casting resin systems to be compared are produced by means of the APG (Autonatic Pressure Gelation) process. In that process, the liquid resin mixture is heated to 40–60° C. and stirred in vacuo. The resin mixture is then injected into the casting mould (which has been heated to 140–150° C.) under a slight pressure of 2–5 bar. While the pressure is maintained, the resin system is gelled in the casting mould within a period of a few minutes, each test specimen produced thus having an enclosed steel body. After gelation, the test specimens are removed from the mould and postured for 10 hours at 140° C. The test specimens are then exposed to a specific temperature profile. The temperature profile consists of a series of cycles having an upper temperature limit of 25° C., at which each specimen is also examined for any crack formation, whereas the lower temperature limit becomes lower with every cycle. In each cycle, the specimens are rapidly brought to the respective lower or upper temperature limit, and maintained at that particular limit temperature for a few hours. The cycle in which a specimen exhibits the first cracks is noted. The average cracking temperature of a resin system is determined from the frequency distribution of crack formation per cycle.

The results of the comparative cracking test of Application Example 3 are listed in the following Table:

| Temperature [° C.] /duration [hours] | IE (20 specimens) cracked specimens | CE (20 specimens) cracked specimens |
| --- | --- | --- |
| 25/8 | 0 | 0 |
| −10/8 + 25/8 | 0 | 17 |
| −20/16 + 25/8 | 1 | 2 |
| −40/16 + 25/8 | 4 | 1 (20) |
| −60/16 + 25/8 | 7 | — |
| −80/16 + 25/8 | 5 | — |
| −100/16 + 25/8 | 3 (20) | — |

In the case of the comparison system, the average cracking temperature is calculated to be −12° C., whereas it is −66° C. for the system according to the invention. The systems according to the invention, in addition to their hydrophobic behaviour, therefore surprisingly also exhibit an appreciably better temperature change behaviour in comparison with an unmodified system.

What is claimed is:

1. A composition comprising
   (a) an epoxy resin,
   (b) an OH-terminated polysiloxane,
   (c) a cyclic polysiloxane and
   (d) a non-ionic, fluoroaliphatic surface-active reagent.

2. A composition according to claim 1, comprising, based on the total composition (a), (b), (c) and (d),
   from 77.0 to 97.99% by weight component (a),
   from 1.0 to 10.0% by weight component (b),
   from 1.0 to 10.0% by weight component (c) and
   from 0.01 to 3.0% by weight component (d),
   the sum of components (a), (b), (c) and (d) being 100% by weight.

3. A composition according to claim 1, comprising as component (a) a cycloaliphatic epoxy resin or an epoxidation product of a natural unsaturated oil or a derivative thereof.

4. A composition according to claim 1, comprising as component (a) hexahydrophthalic acid diglycidyl ester and 3,4-epoxycyclohexylmethyl 3',4'-epoxycyclohexanecarboxylate as well as epoxidised soybean oil or epoxidised linseed oil.

5. A composition according to claim 1, comprising as component (b) a polysiloxane of formula I

wherein $R_1$ and $R_2$ are each independently of the other $C_1$–$C_{18}$alkyl, $C_5$–$C_{14}$aryl or $C_6$–$C_{24}$-aralkyl and n is an average value of from 3 to 60.

6. A composition according to claim 5, comprising as component (b) a polysiloxane of formula I wherein $R_1$ and $R_2$ are each independently of the other methyl, ethyl or phenyl.

7. A composition according to claim 5, comprising as component (b) a polysiloxane of formula I wherein $R_1$ and $R_2$ are methyl.

8. A composition according to claim 1, comprising as component (c) a cyclic polysiloxane of formula II

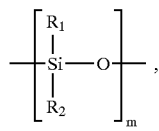
(II)

wherein $R_1$ and $R_2$ are each independently of the other $C_1$–$C_{18}$alkyl, $C_5$–$C_{14}$aryl or $C_6$–$C_{24}$-aralkyl and m is an integer from 3 to 12.

9. A composition according to claim 8, comprising as component (c) a cyclic polysiloxane of formula II wherein $R_1$ and $R_2$ are each independently of the other methyl, ethyl or phenyl and m is an integer from 3 to 8.

10. A composition according to claim 8, comprising as component (c) octamethylcyclotetrasiloxane, decamethylcyclopentasiloxane, dodecamethylcyclohexasiloxane or a hydrolysate of dimethyldichlorosilane.

11. A composition according to claim 1, comprising as component (d) a non-ionic, fluoroaliphatic surface-active reagent of formula

(III)

or

(IV), wherein m=1 to 200, $R_f$ is a linear or branched perfluorinated alkyl having from 2 to 22 carbon atoms and R=H, $C_1$–$C_6$alkyl or $R_f$.

12. A composition according to claim 11, comprising as component (d) compounds of formula (III) or (IV) in which the molecular mass according to the theoretical empirical formula is from 300 to 8000.

13. A composition according to claim 12, comprising as component (d) 1,1,2,2-tetrahydroperfluorooctanol or $R_f$—COO—$(CH_2CH_2O)_m$—R, wherein $R_f$ is a linear perfluorinated alkyl having from 16 to 18 carbon atoms, m=110–130 and R=H.

14. A composition according to claim 1, additionally comprising as further component (g) emulsifiers or thickeners.

15. A composition according to claim 14, comprising as component (g) from 0.01 to 3.5% by weight, based on the sum of components (a) to (d), highly dispersed, hydrophilic, untreated silicic acid.

16. A composition according to claim 1, additionally comprising a curing agent.

17. A composition according to claim 16, wherein the curing agent is selected from polycarboxylic anhydride (e) or from a polycarboxylic anhydride (e) together with an accelerator (f).

18. A composition according to claim 16, wherein the curing agent is an initiator system for cationic polymerisation.

19. A composition according to claim 14, additionally comprising a curing agent.

20. A composition according to claim 19, wherein the curing agent is selected from a polycarboxylic anhydride (e) or from a polycarboxylic anhydride (e) together with an accelerator (f).

21. A composition according to claim 19, wherein the curing agent is an initiator system for cationic polymerisation.

22. A composition according to claim 15, additionally comprising a curing agent.

23. A composition according to claim 22, whererin the curing agent is selected from a polycarboxylic anhydride (e) or from a polycarboxylic anhydride (e) together with an accelerator (f).

24. A composition according to claim 22, wherein the curing agent is an initiator system for cationic polymerisation.

25. A composition according to claim 1, which comprises filler.

26. A composition according to claim 25, in which the filler is selected from the group consisting of quarz powder, silanised quartz powder, aluminium hydroxide and aluminium oxide.

27. A crosslinked prodect obtainable by curing a composition according to claim 1.

28. An electrical insulating material according to claim 27.

* * * * *